(12) United States Patent
Frangioso et al.

(10) Patent No.: US 7,240,154 B2
(45) Date of Patent: Jul. 3, 2007

(54) LOW COST FLEXIBLE NETWORK ACCESSED STORAGE ARCHITECTURE

(75) Inventors: Ralph Frangioso, Franklin, MA (US); Robert P. Wierzbicki, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 92 days.

(21) Appl. No.: 10/878,164

(22) Filed: Jun. 28, 2004

(65) Prior Publication Data
US 2005/0289217 A1    Dec. 29, 2005

(51) Int. Cl.
G06F 13/00 (2006.01)

(52) U.S. Cl. .................. 711/114; 711/156; 711/173

(58) Field of Classification Search ................. 711/114, 711/156, 158, 173
See application file for complete search history.

(56) References Cited

U.S. PATENT DOCUMENTS

| | | | | |
|---|---|---|---|---|
| 6,583,989 | B1 * | 6/2003 | Guyer et al. ................. | 361/724 |
| 6,948,012 | B1 * | 9/2005 | Valin et al. .................... | 710/38 |
| 6,981,094 | B2 * | 12/2005 | Nonaka et al. ............. | 711/114 |
| 7,143,228 | B2 * | 11/2006 | Iida et al. ....................... | 711/4 |
| 7,185,143 | B2 * | 2/2007 | Tanaka et al. .............. | 711/114 |
| 2003/0105767 | A1 * | 6/2003 | Sonoda et al. .............. | 707/100 |
| 2004/0193791 | A1 * | 9/2004 | Felton et al. ................ | 711/112 |

OTHER PUBLICATIONS

Wilkes et al., 'The HP AutoRAID hierarchical storage system', 1996, pp. 1-25.*
Menon, Jai, 'A Performance Comparison of RAID-5 and Log-Structured Arrays', 1995, pp. 167-168.*
Chen, Peter et al. 'RAID: High-Performance, Reliable Secondary Storage', 1994, ACM Computing Surveys, vol. 26, No. 2.*
Massiglia, Paul, 'The RAID book, A Storage System Technology Handbook', 6th editions, RAID Advisory Board, Feb. 1997.*

* cited by examiner

Primary Examiner—Reba I. Elmore
(74) Attorney, Agent, or Firm—BainwoodHuang

(57) ABSTRACT

A storage solution includes a first enclosure having modules and non-volatile memory, such as hard disk drives. These modules convert file I/O to block I/O. A second enclosure includes second modules and non-volatile memory. These modules are operable to cause the block I/O to be stored on the non-volatile storage in either the first or second enclosure. Thus, the modules that perform block I/O storage can access storage that resides in the file I/O server. In a different arrangement, the storage system has an enclosure having modules and non-volatile memory. One module converts file I/O to block I/O. Another module transfers block I/O to the non-volatile memory. The first and second modules are interconnected via a data bus. Block I/O is transferred between the first module and the second module via the data bus. The data bus crosses a midplane that interconnects the modules. The second module stores data in the enclosure.

24 Claims, 4 Drawing Sheets

LOW COST FLEXIBLE NETWORK ACCESSED STORAGE ARCHITECTURE

FIELD OF THE INVENTION

The present invention relates generally to storage systems, and more particularly to flexible designs for Network Accessed Storage systems.

BACKGROUND OF THE INVENTION

In the past, computer users have relied upon network file servers to provide distributed file services between the file server and a separate storage system. Files would be transferred from host computers over a network to the file server. The file server would then use any of several methods for storing the files on remote disk drives, usually via an I/O channel connection. Expensive servers such as Microsoft NT servers or Sun Solaris servers have been employed in front of expensive storage systems to provide this functionality. This has been found to be a relatively cumbersome and expensive solution.

Designers and manufacturers of storage systems have developed technology integrate these systems. The newer storage technology is known as a network accessed storage system, or NAS. A NAS is a storage system that connects directly to a network, such as a Gigabit Ethernet network. The NAS contains an integrated file server or controller for delivering distributed file services to hosts. File I/O is transferred over the network connection, and is cached in the NAS system and stored on the disk drives, and vice-versa.

Current NAS systems typically employ many different chassis holding equipment that performs various specific functions, making the NAS quite inflexible. Furthermore, the use of optical connectors and cables is often required to connect the various chassis. Though less expensive than remote server solutions, significant cost is incurred in providing a NAS because of these issues. There are now many storage customers that desire NAS functionality but want or need a lower cost system. A more flexible NAS system that can be manufactured and maintained at significantly lower costs than current systems is therefore highly desirable.

SUMMARY OF THE INVENTION

In accordance with the principles of the invention, a storage system includes a first enclosure having a first plurality of modules and non-volatile memory—for example, hard disk drives. Each of these modules is operable to convert file I/O to block I/O. A second enclosure includes a second plurality of modules and non-volatile memory. Each of these modules is operable to cause the block I/O to be stored on the non-volatile storage in either the first or second enclosure. Thus, the modules that perform block I/O storage can conveniently access storage that resides in the file I/O enclosure.

More particularly, each module of the first plurality of modules is coupled to a personality module that includes a network interface for connecting to a network—for example an Ethernet network—for transferring file I/O between the module and a host.

Each module of the first plurality of modules includes a channel I/O output for connecting to a first channel I/O medium—for example Fibre Channel—for transferring block I/O from the module to the second enclosure. In turn, each module of the second plurality of modules is coupled to a personality module that includes a first channel I/O input for connecting to the first channel I/O medium for transferring the block I/O from each module of the first plurality of modules.

Furthermore, each module of the second plurality of modules includes a channel I/O output for connecting to a second channel I/O medium—again for example Fibre Channel—for transferring block data between the module and the first enclosure. In turn, each module of the first plurality of modules includes a Channel I/O input for connecting to the second Channel I/O medium for transferring block I/O between the second plurality of modules and the non-volatile memory in the first enclosure.

According an implementation of this arrangement, the block I/O transfer modules can store data on disk drives installed in slots in the file I/O transfer modules, slots that would otherwise be empty.

In accordance with a different arrangement of the invention, a storage system includes a first enclosure including a first plurality of modules and non-volatile memory, for example hard disk drives. A first module of the first plurality of modules is operable to convert file I/O to block I/O. A second module of the first plurality of modules is operable to transfer block I/O to the non-volatile memory. The first and second modules are interconnected via a first data bus. Block I/O is transferred between the first module and the second module via the first data bus.

More particularly, the first plurality of modules and non-volatile memory are coupled to a first midplane. The first data bus crosses the first midplane and interconnects the first and second modules via the first midplane.

According to an implementation of this arrangement, NAS functionality is provided in a single enclosure.

These innovative storage systems, and methods for providing the same, provide a greatly needed low cost, compact NAS storage solution.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
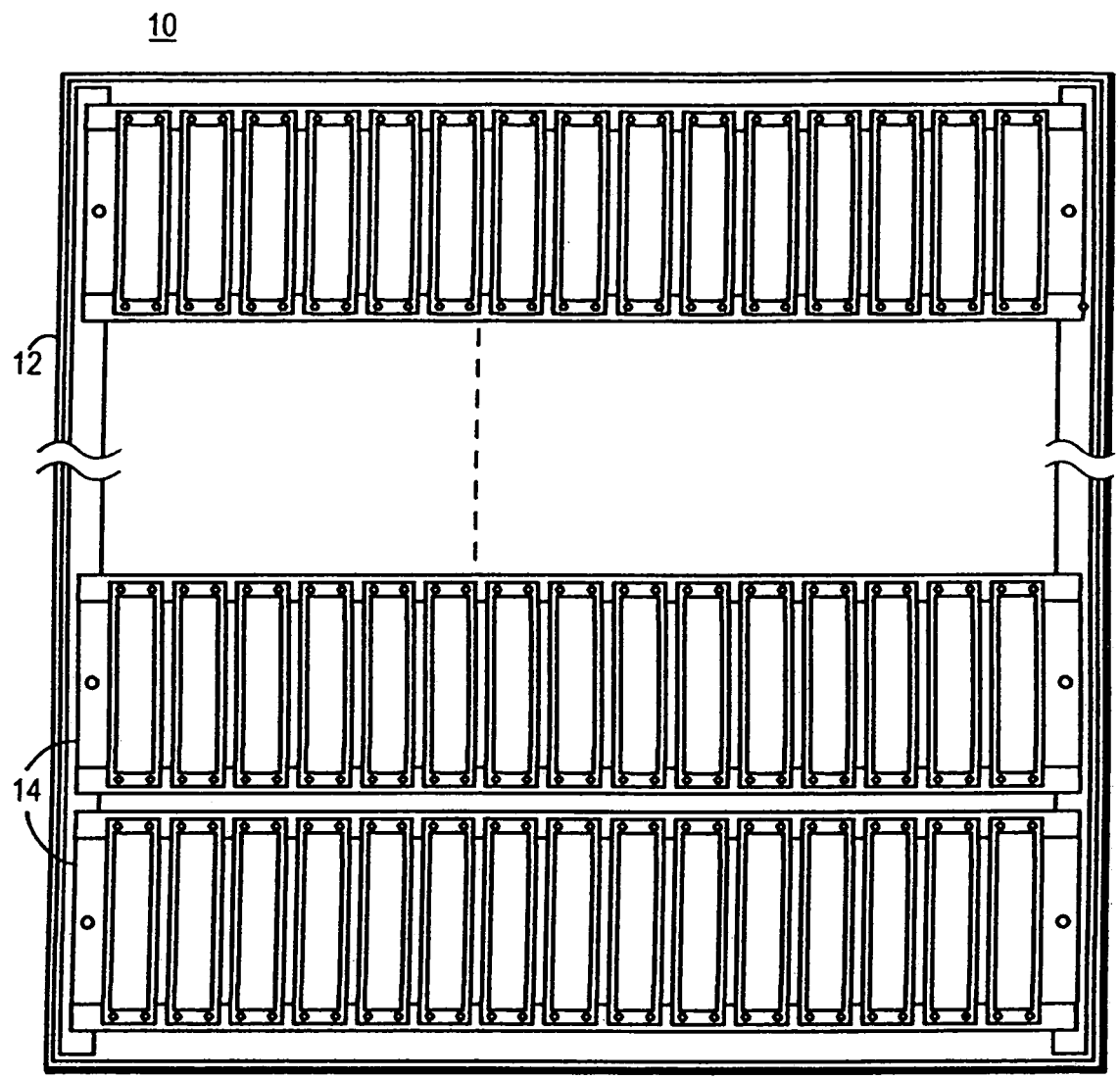
FIG. 1 is a representation of a rack mount server storage system.

Referring to FIG. 1, there is shown a storage system 10 in which the principles of the invention may be employed. The storage system 10 includes a rack mount cabinet 12 that holds chassis or enclosures 14. Many of the enclosures 14 include a portion for installing various types of modules, a portion where disk drives are installed, and a midplane that connects the modules to the disk drives and in some cases to each other. Various possible arrangements may place the disk drives in the front portion and the modules in the back portion, or vice-versa. The enclosures 14 may also include power supply units. Alternatively, such things as power supply enclosures and backup power supply enclosures, control modules or the like may exist in peripheral enclosures 14.

Figure 2:
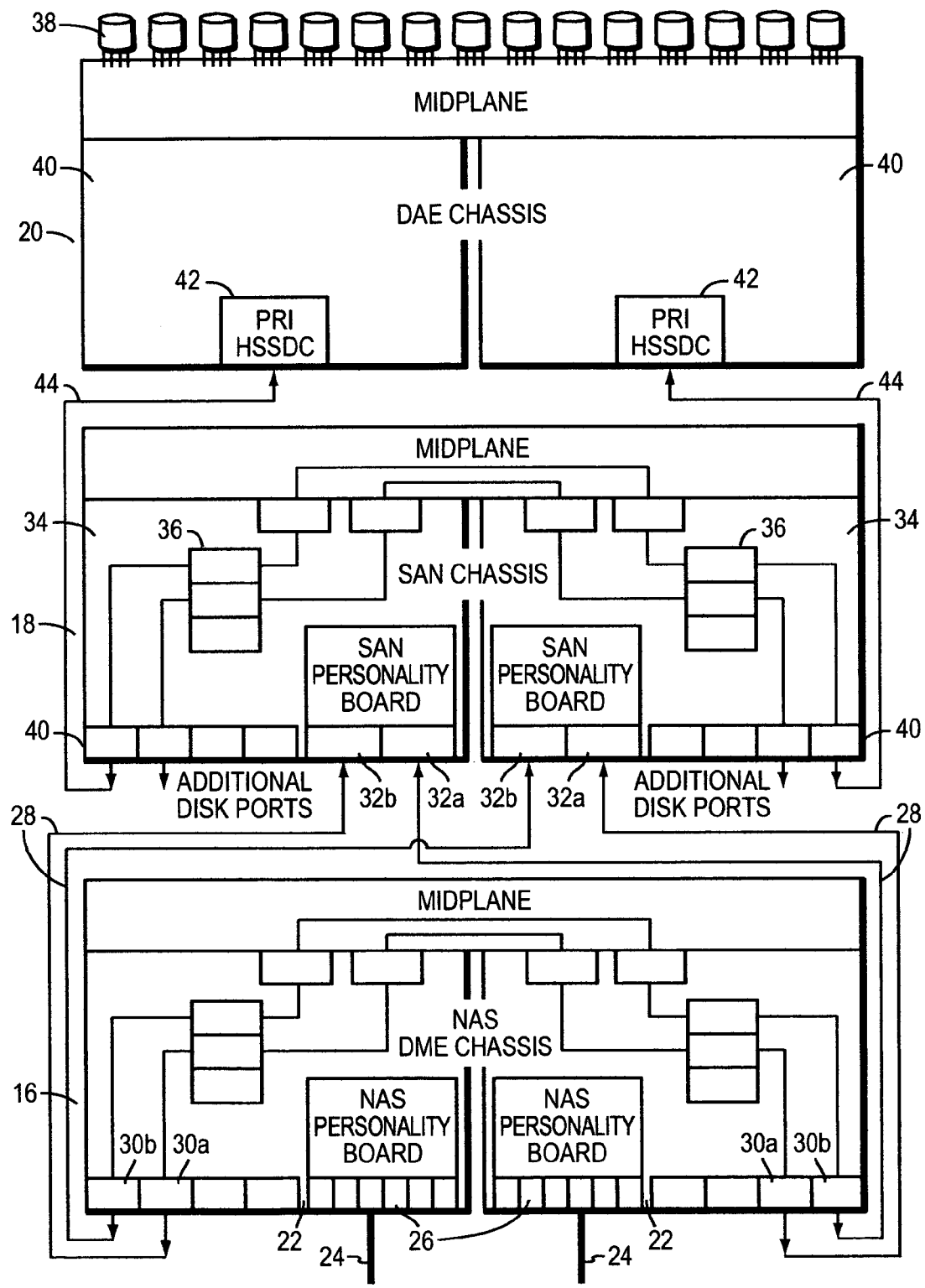
FIG. 2 is a block diagram of a prior art implementation of a NAS system.

In accordance with a prior art implementation of the storage system 10 of FIG. 1, the enclosures 14 may contain many different types of modules, all performing different functions, in order to implement a NAS (network accessed storage) system. Thus, many module and enclosure FRUs (field replaceable units) must be manufactured, shipped, and spared to utilize the storage system 10. For example, consider an example of a prior art implementation of a NAS system as shown in FIG. 2. Each enclosure 16, 18, and 20 includes different modules for performing different tasks. The bottom enclosure 16 includes dual NAS modules 22 for taking file I/O from a network 24 via NAS personality board 26, converting that file I/O to block data, and forwarding the block data to the SAN (storage area network) enclosure 18 via Fibre Channel connections 28. The Fibre Channel connections 28 consist of an optical cable connected to the NAS and SAN enclosures via optical connectors 30a,b and 32a,b.

The middle SAN enclosure 18 includes dual processor modules 34 for caching block I/O data from the NAS enclosure 16, converting the block I/O data to RAID (Redundant Array of Inexpensive Disks) format, and transferring the RAID data to/from disk drives 38, access to which is controlled by one or more enclosures such as the top enclosure 20 labeled "DAE Chassis". Optical Fibre Channel connectors 42, coupled to Fibre Channel controllers 36, connect the processor modules 34 via optical or copper cable 44 to the one or more DAE enclosures 20. The DAE enclosure 20 includes dual control modules 40 for providing access to disk drives 38.

For purposes of clarity, file I/O is a mechanism used to access and transfer "files" in accordance with different O/S types and transport techniques. For example, file I/O may use NFS or CIFS/SMB access protocols over TCP/IP Ethernet. File I/O is typically designed to avoid conflicts between file access so that files may be shared between users and between different OS types. Block I/O, on the other hand, is the basic mechanism for disk access, and moves data in block sizes (e.g. 16K, 128K, etc.) over SCSI, Fibre Channel, etc. I/O channels to and from the disk. So, for example, a file may be transferred as file I/O via TCP/IP, de-packetized, buffered, split into blocks, and transferred as block I/O (or further translated for fault tolerance purposes e.g. to RAID format) to the disks.

In order to store a file on the system of FIG. 2, the file is transferred over the network 24 to the NAS enclosure 16. One of the modules 22 in the NAS enclosure 16 converts the file to block data and transfers the block data over Fibre Channel optical cables 28 to modules 34 in the SAN enclosure 18. The SAN enclosure 18 then converts the block data to RAID format and transfers this RAID data over Fibre Channel optical cables 44 to disk storage 38 on a DAE enclosure such as 20. The multiple chassis and optical connections traversed in order to move the file from the NAS enclosure 16 to the DAE enclosure 20 and store the file on disks 38 result in an overly expensive system.

Figure 3:
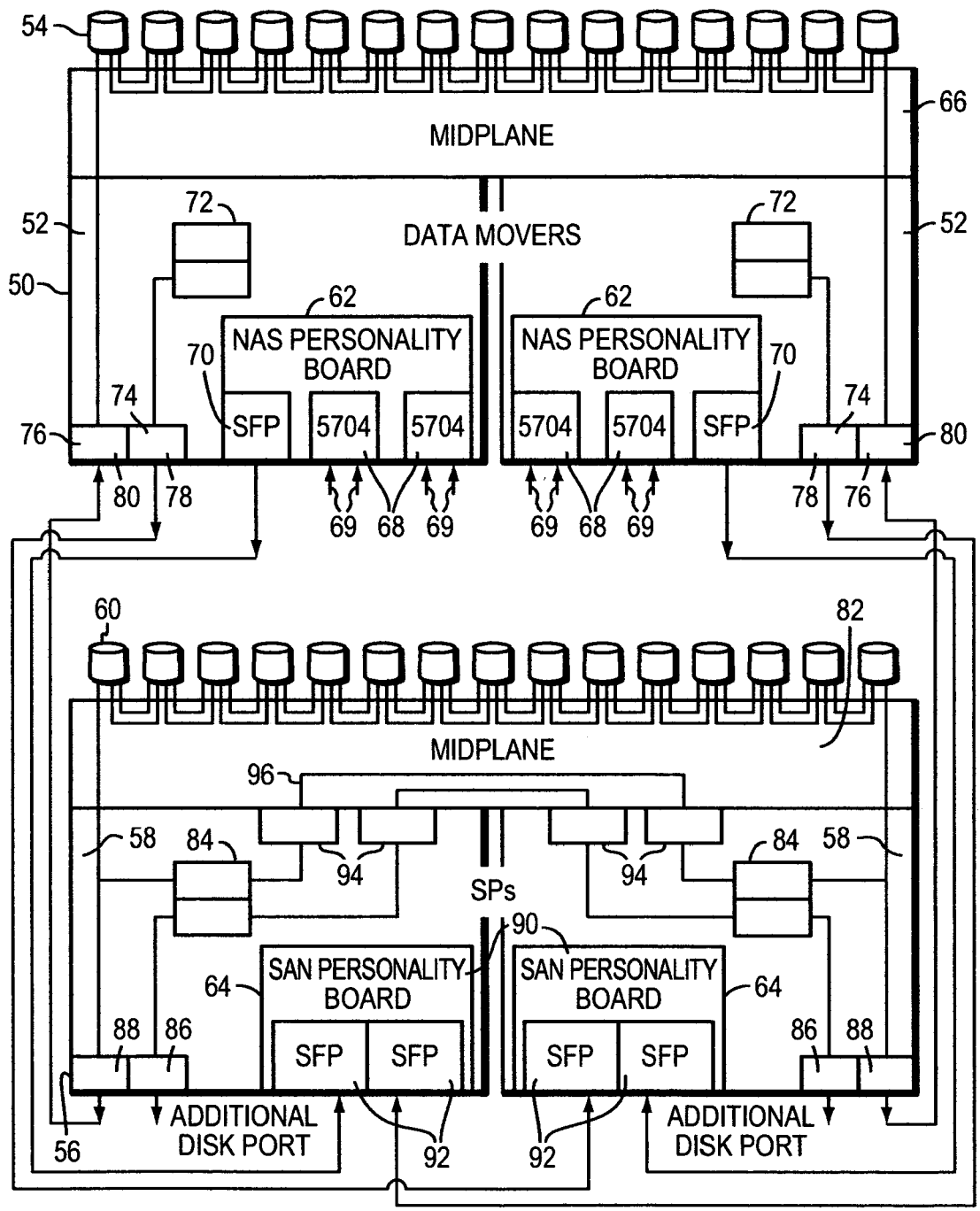
FIG. 3 is a block diagram of a NAS system implemented in accordance with the principles of the invention.

In FIG. 3 there is shown a NAS storage system incorporating the principles of the invention. Shown is an enclosure 50 including a pair of data mover modules 52 and disk drives 54, as well as an enclosure 56 including a pair of storage processors 58 and disk drives 60. Generally, file data enters the data movers 52 and is converted to block data, which is transferred to the storage processors 58. The storage processors 58 then preferably translate the block data to RAID format and cause the data to be stored on disk drives 54 or 60, or in larger systems, on disk drives located in other enclosures in the system.

Several aspects of the invention make the NAS system arrangement of FIG. 3 very flexible and cost effective. First of all, an entire NAS system can be constructed from just the two enclosures shown. Note that disk drives are installed in the data mover enclosure 50 and in the storage processor enclosure 56. As will be further described, the storage processors 58 can access all of these disk drives. Contrast this with the system of FIG. 2, wherein disk drives cannot be installed in the NAS and SAN chassis. The two enclosure solution is a cost effective entry level NAS solution that can be expanded by the addition of more DAE enclosures.

Furthermore, as will be further described, there are no optical cables or optical connectors required in the system of FIG. 3. All connections are implemented with copper cables or etch. This also results in significant cost savings.

Also, as can be seen, the data mover modules 52 and the storage processor modules 58 are substantially the same with the exception of personality boards 62 and 64. This is advantageous and cost effective because the same base module can be used for different functions just by changing the personality board. Thus, many arrangements of storage systems can be constructed simply by arranging base modules and personality board FRUs (field replaceable units).

In accordance with a preferred embodiment of the system, an example of which shown in FIG. 3, the top enclosure 50 includes a pair of data mover modules 52 coupled in the back of the enclosure to a midplane 66. Disk drives 54 reside in the front of the enclosure 50 and are also coupled to the midplane 66. The data mover personality board 62 on each data mover module 52 includes a quad Gigabit Ethernet interface 68 for receiving file I/O over Ethernet network 69. The quad Gigabit Ethernet interface 68 may be constructed for example of a pair of Broadcom 5704 dual Gigabit Ethernet transceivers. Though the preferred embodiment of the invention implements a quad Gigabit Ethernet Interface, it is understood that 10 Mbit Ethernet or another type of network connection, including newer higher speed network connections, could be implemented on the data mover personality board 62 without departing from the principles of the invention. The data mover personality board 62 also includes an I/O channel output port 70. The I/O channel output port 70 is one of two I/O output ports that are coupled to input ports on one of the storage processor modules 58, as will be further described. The I/O channel output ports are preferably coupled to Fibre Channel controllers 72 and implemented as Fibre Channel I/O output ports, but other I/O channel technologies such as SATA (Serial ATA), SAS (Serial Attached SCSI), etc. may be implemented without departing from the principles of the invention.

Further included on the data mover module 52 is a pair of I/O channel interfaces 74 and 76, which again are preferably Fibre Channel interfaces. The I/O channel interface 74 is the other I/O channel output for transferring block I/O data to one of the storage processors 58 via HSSDC ("High Speed Serial Data Connector") 78, as will be further described. In accordance with an aspect of the invention, the other I/O channel interface 76 inputs block data from a storage processor 58 via an HSSDC 80, as will also be described. In the Fibre Channel implementation shown, the I/O Channel interface 76 is connected to a Fibre Channel loop that interconnects the disk drives 54 and 60.

The bottom enclosure 56 depicts a pair of storage processor modules 58 coupled to a midplane 82. Disk drives 60 reside in the front of this enclosure 56 and are also coupled to the midplane 82. Note that the Fibre Channel controllers 84 and I/O channel Interfaces 86 and 88 on each processor module 58 are arranged in the same manner as shown in the data mover module 52. The only difference between the two modules lies in the storage processor personality board 90 and the configuration of the I/O channel ports. Each storage processor personality board 90 includes two I/O channel inputs 92, for receiving block data from the data mover modules 52. The Storage Processors 58 also include bus interface 94. The bus interfaces 94 are interconnected by a bus 96 across the midplane 82, and is used for communication between the storage processors 58, as will be further described. The bus 96 may be a Fibre Channel peer-to-peer connection as shown, or could be an Infiniband™ connection, or a PCI connection, etc. Note that the bus interfaces 94 and bus 96 are not shown in the data mover modules 52, because in this embodiment the data movers do not communicate with each other. The data mover modules 52 can include the bus interfaces 94 and simply not use them. This is preferable so that the base modules 52 and 58 are interchangeable.

The HSSDC Fibre Channel ports 86 and 88 on each storage processor module 58 are connected differently than those for the data mover modules 52. In accordance with the invention, each Fibre Channel Port 88 outputs reconstructed block data (e.g. RAID data) from each storage processor 58 to the data mover module Fibre Channel input 76 for access to the disks 54 in the data mover enclosure 50. The other Fibre Channel Port 86 outputs data to other disks that may be installed in the system.

The operation of the storage system including the data mover modules 52 and the storage processor modules 58 is now described. In order to store file data, the data is transferred via the network 69, in the embodiment shown a Gigabit Ethernet network, from a host to the Gigabit Ethernet interface 68 on one of the data mover personality boards 62. The data mover 52 converts the file data to block data. The data is transferred via the Fibre Channel Port 70 and/or 74 to the Fibre Channel port 92 on a storage processor module 58. The block data received by the storage processor module 58 is stored in the storage processor for further transfer to disk. For purposes of fault tolerance, the block data is copied from one storage processor module 58 to the other storage processor module 58 via the bus interfaces 94 and bus 96. The block data in each storage processor 58 may then be converted to RAID format and transferred via Fibre Channel Ports 86 to disks in another enclosure. Or, in accordance with an aspect of the invention, the reformatted block data may be transferred to disks 60 in the storage processor enclosure 56, or transferred via the Fibre Channel Ports 88 to the Fibre Channel Port 76 on the data mover modules 52 and then to the disk drives 54 in the data mover module enclosure 50. According to this aspect of the invention, the storage processor modules 58 can make use of disks installed in the storage processor enclosure 56 or the data mover enclosure 50. Significant cost savings and system flexibility is thereby achieved.

In accordance with a further aspect of the invention, the system of FIG. 3 requires no optics. That is, no optical cables are required, nor MIAs (electrical <-> optical media interface adapter), nor optical SFPs (small form factor pluggable connectors). Furthermore, no copper SFPs are required. The data mover personality boards 62 are arranged such that a copper cable can plug directly into the Fibre Channel port 70 on each data mover personality board 62. Furthermore, the two Fibre Channel input ports 92 on the storage processor personality boards 64 also accept the copper cables. These optimizations are possible due to the elimination of the separate SAN enclosure between the data movers and disk enclosures as shown in the prior art FIG. 2, which required optical cables and connectors. The elimination of all optical cables and connectors provide even further cost savings.

Figure 4:
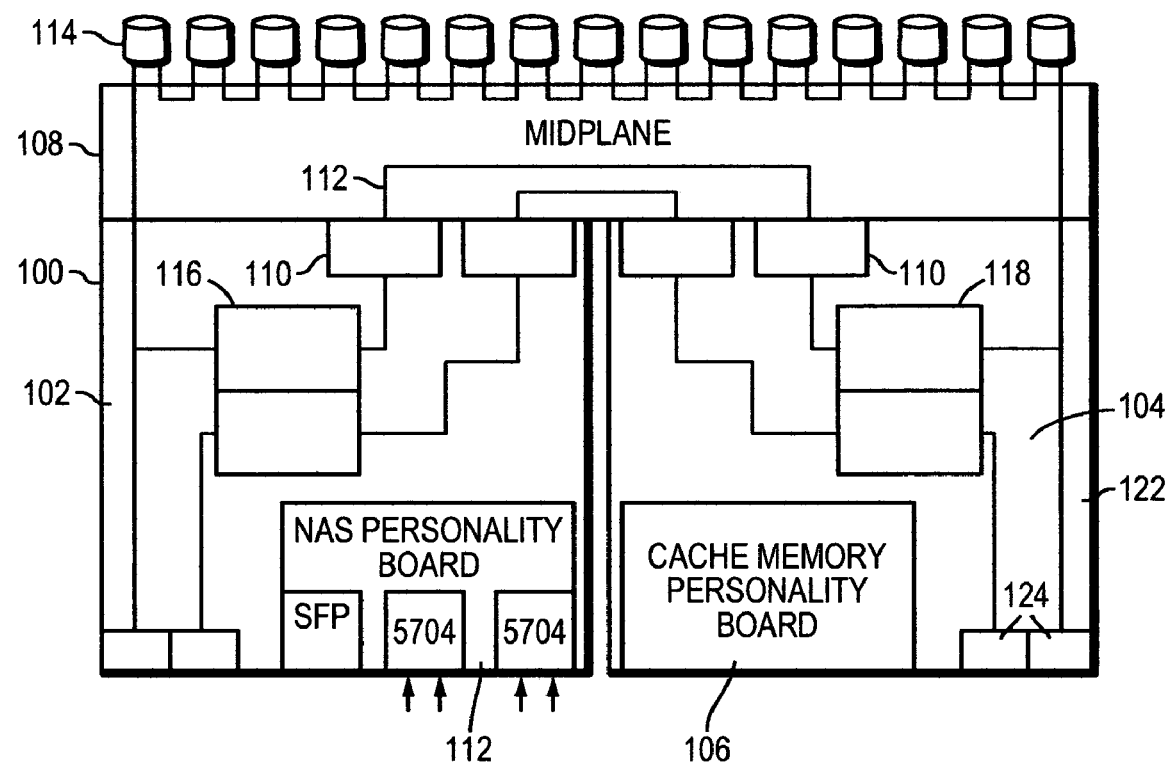
FIG. 4 is a block diagram of a NAS system implemented in accordance with further aspects of the invention.

In accordance with a different implementation of the invention, a data mover module and a storage processor module are installed within the same enclosure to provide an even lower cost, very compact NAS solution. Referring to FIG. 4, an enclosure 100 is shown to include a data mover module 102 that is the same as the data mover module 52 shown in FIG. 3. The storage processor module 104 is the same as the storage processor module 58 of FIG. 3. However, a cache memory board 106 replaces the storage processor personality board 64. The cache memory board 106 is a battery backed up redundant memory. It reproduces the functionality previously described with regard to the system of FIG. 3 wherein the block data stored in one storage processor module 58 was transferred via the midplane bus 96 for redundant storage in the other storage processor module 58. This allows the midplane bus to be used for an innovative, cost effective purpose.

As shown, the data mover module 102 and the storage processor module 104 are coupled to a midplane 108 within the enclosure 100. The data mover module 102 and the storage processor 104 include Fibre Channel controllers 116 and 118, which are coupled via bus interfaces 110 to a midplane bus 112. Disk drives 114 are coupled to the other side of the midplane 108. In this compact NAS arrangement, file I/O enters the data mover module 102 via the quad Gigabit Ethernet interface as previously described. The file I/O is converted to block I/O, also as previously described. However, rather than exiting the data mover module 102 via a Fibre Channel port to reach the storage processor module 104 for disk storage, the block data is transferred across the midplane bus 112 via the bus interfaces 110 to the block storage cache memory 106 on the storage processor module 104. It is then preferably converted to RAID format and either transferred via an internal Fibre Channel loop 122 for storage on the disk drives 114 in the enclosure 100, or transferred out through the Fibre Channel ports 124 for storage on disk drives in another enclosure in the system. This system arrangement provides an entire NAS system in one enclosure.

Once again it should be noted that according to this architecture, the only difference between the data mover module 102 and the storage processor module 104 is the installation of either a data mover personality board or a cache memory board. The modules 102 and 104 can be shipped as the same FRU, being specialized in manufacturing or on site with the proper personality boards or cache memory boards.

It should be noted that in the examples shown in FIGS. 3 and 4, the chassis (enclosures) and midplanes are all exactly the same. This allows the base modules to be interchanged between chassis. The ability to implement a NAS storage system with such few enclosures, along with the ability to interchange all the described modules and enclosures and specify their functionality by adding or swapping in the proper personality boards or cache memory provides unparalleled flexibility in a NAS system. For example, a small enterprise organization might begin with a chassis containing only the enclosure of FIG. 4, along with the necessary power supply modules if required. As the organization grows, and increased storage space and fault tolerance is required, a new enclosure could be added. The existing enclosure, configured as shown in FIG. 4, could be changed to either the dual data mover module enclosure 50 of FIG. 3 or the dual storage processor enclosure 56 of FIG. 3. Say for example the modules in the existing enclosure are converted to storage processor modules 58 by installation of storage processor personality modules 90. Dual modules would then be installed in the new enclosure and configured, via installation of data mover personality modules, as data mover modules 52, the enclosure 50 including disk drives 54. Now the system has been converted to to the larger, fault tolerant innovative system of FIG. 3 while still requiring only two enclosures and no optics. More disk drive enclosures can be added as storage capacity requirements increase. It can be seen that, as the NAS system grows, many different configurations can be achieved by installing more of the same module FRUs and changing the functionality of existing module FRUs via the installation of particular personality boards.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. A storage system comprising:
    a first enclosure including a data mover module and non-volatile memory, the data mover module being operable to (1) convert a file I/O received from a host to a first block I/O and transfer the first block I/O out of the first enclosure via a first I/O channel, and (2) receive a second block I/O into the first enclosure via a second I/O channel and store the second block I/O in the non-volatile memory; and
    a second enclosure including a storage processor module and non-volatile memory, the storage processor module being operable to (1) receive the first block I/O from the first enclosure via the first I/O channel, (2) generate the second block I/O from the first block I/O, and (3) transfer the second block I/O to the first enclosure via the second I/O channel to cause the second block I/O to be stored on the non-volatile storage in the first enclosure.

2. The storage system of claim 1 wherein the non-volatile memory is hard disk drives.

3. The storage system of claim 2 wherein the second block I/O is generated from the first block I/O by translation into RAID format.

4. The storage system of claim 1 wherein the data mover module includes a network interface for connecting to a network for transferring the file I/O between the data mover module and the host.

5. The storage system of claim 4 wherein the network is an Ethernet network.

6. The storage system of claim 1 wherein the data mover module includes a first channel I/O output for connecting to a first channel I/O medium for transferring the first block I/O from the data mover module to the second enclosure.

7. The storage system of claim 6 wherein the storage processor module includes a first channel I/O input for connecting to the first channel I/O medium for receiving the first block I/O from the first enclosure.

8. The storage system of claim 7 wherein the first channel I/O medium is Fibre Channel.

9. The storage system of claim 6 wherein the storage processor module includes a second channel I/O output for connecting to a second channel I/O medium for transferring the second block I/O between the storage processor module and the first enclosure.

10. The storage system of claim 9 wherein the data mover module includes a second channel I/O input for connecting to the second channel I/O medium for transferring the second block I/O from the storage processor module to the non-volatile memory in the first enclosure.

11. The storage system of claim 10 wherein the second channel I/O medium is Fibre Channel.

12. The storage system of claim 11 wherein the first channel I/O input, the second channel I/O input, the first channel I/O output, and the second channel I/O output, the first channel I/O medium and the second channel I/O medium are copper.

13. A method for use in a storage system comprising the steps of:
    including in a first enclosure a data mover module and non-volatile memory;
    on the data mover module, (1) converting a file I/O received from a host to a first block I/O and transferring the first block I/O out of the first enclosure via a first I/O channel, and (2) receiving a second block I/O into the first enclosure via a second I/O channel and storing the second block I/O in the non-volatile memory;
    including in a second enclosure a storage processor module and non-volatile memory; and
    on the storage processor module, (1) receiving the first block I/O from the first enclosure via the first I/O channel, (2) generating the second block I/O from the first block I/O and (3) transferring the second block I/O to the first enclosure via the second I/O channel to cause the block I/O to be stored on the non-volatile storage in the first enclosure.

14. The method of claim 13 wherein the non-volatile memory is hard disk drives.

15. The method of claim 14 wherein generating the second block I/O from the first block I/O comprises translating the first block I/O to RAID format.

16. The method of claim 13 further comprising the step of:
    coupling the data mover module to a network for transferring the file I/O between the data mover module and the host.

17. The method of claim 16 wherein the network is an Ethernet network.

18. The method of claim 13 further comprising the step of:
    including a first channel I/O output on the data mover module for connecting to a first channel I/O medium for transferring the first block I/O from the data mover module to the second enclosure.

19. The method of claim 18 further comprising the step of:
    coupling the storage processor module to the first channel I/O medium for receiving the first block I/O from the first enclosure.

20. The method of claim 19 wherein the first channel I/O medium is Fibre Channel.

21. The method of claim 18 further comprising the step of:
    including a second channel I/O output on the storage processor module for connecting to a second channel I/O medium for transferring the second block I/O between the storage processor module and the first enclosure.

22. The method of claim 21 further comprising the step of: including a second channel I/O input on the data mover module for connecting to the second channel I/O medium for transferring the second block I/O from the storage processor module to the non-volatile memory in the first enclosure.

23. The method of claim 22 wherein the second Channel I/O medium is Fibre Channel.

24. The method of claim 23 wherein the first channel I/O input, the second channel I/O input, the first channel I/O output, and the second channel I/O output, the first channel I/O medium and the second channel I/O medium are copper.

* * * * *